United States Patent [19]

LaHaye et al.

[11] 4,254,715
[45] Mar. 10, 1981

[54] SOLID FUEL COMBUSTOR AND METHOD OF BURNING

[75] Inventors: Paul G. LaHaye; John W. Bjerklie; Ivan G. Most; Kenneth G. Hagen, all of Cape Elizabeth, Me.

[73] Assignee: Hague International, So. Portland, Me.

[21] Appl. No.: 960,750

[22] Filed: Nov. 15, 1978

[51] Int. Cl.³ .............................................. F23H 3/00
[52] U.S. Cl. ................................... 110/300; 110/214; 110/248; 110/259; 110/278; 126/152 B; 126/163 R
[58] Field of Search ............... 110/210, 211, 214, 248, 110/249, 258, 259, 254, 278, 300, 346; 126/152 B, 163 R, 170, 155, 167

[56] References Cited

U.S. PATENT DOCUMENTS

| 1,369,939 | 3/1921 | Shaffer | 110/300 |
|---|---|---|---|
| 1,877,214 | 9/1932 | Hoodman | 110/254 X |
| 1,982,918 | 12/1934 | Marty | 110/300 |
| 3,399,662 | 9/1968 | Holstein et al. | 110/278 X |
| 3,509,834 | 5/1970 | Rosenberg et al. | 110/254 X |
| 4,048,927 | 9/1977 | Mallek et al. | 110/210 X |
| 4,156,393 | 5/1979 | Mallek et al. | 110/300 X |
| 4,156,394 | 5/1979 | Mallek et al. | 110/300 |

*Primary Examiner*—Edward G. Favors
*Attorney, Agent, or Firm*—Wolf, Greenfield & Sacks

[57] ABSTRACT

A primary combustion chamber is located above a secondary combustion chamber with a support grate between the two for supporting particulate solid waste fuel to be burned efficiently. Primary air is introduced to the primary combustion chamber with secondary air introduced below the grate into a combustion gas flow to cause complete burning in the secondary combustion chamber. A brick wall screen means of high temperature, corrosion-resistant brick forms the secondary combustion chamber to allow exhaust gaseous product to exit therethrough while screening out ash which can be removed from the combustion area. The gaseous product passed through the screen is then passed to a heat exchanger to utilize part of the heat produced for heating primary and secondary air used in the combustor. The exhaust gas from the heat exchanger can then be put to use in a boiler or other energy producing device.

6 Claims, 4 Drawing Figures

ND METHOD OF BURNING

SOLID FUEL COMBUSTOR AND METHOD OF BURNING

BACKGROUND OF THE INVENTION

The combustion of biomass and other energy containing organic matter with a high water content typified by bark, lignite, wood, garbage, coal slurries and waste products, some of which also contain a high percentage of alkali metals, sulfur, silicon oxides, presents a difficult problem if the combustion apparatus is to burn the material efficiently, produce acceptable levels of emissions in the effluent gas and permit adequate "turndown" of the combustion process to match the thermal energy needs of a domestic or industrial energy user.

Wood residue presents a particular problem with regard to its disposal at sawmills, paper mills, and other types of wood processing plants. The residue often contains a large amount of moisture and is known to produce particulate in the emissions in significant amounts when burned in conventional equipment such as Teepee burners. Thus, it has been a problem to merely dispose of wood residue and meet the National environmental standards by burning even if one is not concerned with harnessing the energy produced by such burning.

It is the primary objective of this invention to provide a solid fuel combustor which has high burning efficiency enabling the conversion of the energy contained therein to a usable form suitable for the generation of steam, electric power, or simply the heating of air for space heating or for the dehydration of processed materials.

It is a further objective of this invention to combust solid fuels containing high percentages of impurities and water in an efficient manner so that a large portion of the energy content of the fuel is effectively employed and not permitted to escape with the effluent gas to the atmosphere as combustible vapors and unburned hydrocarbons.

It is a further objective of this invention to combust industrial process plant residuals in a manner that prevents the escape of small quantities of inorganic and unburned particulate matter of the submicron size, in particular, to escape into the atmosphere with the effluent gas.

It is a further objective of this invention to maintain a stable and efficient combustion reaction with a high turndown ratio; i.e., the ratio of the energy release at maximum rating to the energy release at minimum output with stable combustion without the use of ancillary fuels such as natural gas or fuel oil so that when the demand for energy is low, the wood residue is not consumed unnecessarily.

It is a further object of this invention to permit close control over the temperature of the products of combustion leaving the combustor to avoid damaging equipment downstream of the combustor by using essentially inert diluents which can be introduced into combustion process such as water, air, recirculated products of combustion, or any other suitable gas.

According to the invention a solid fuel combustor has a primary combustion chamber with means for introduction therein of primary air and a fuel entrance port for filling the chamber with particulate fuel. Preferably the fuel entrance port can be sealed once the chamber is charged with solid fuel. A support grate underlies the primary combustion chamber for carrying fuel. A secondary combustion chamber preferably lies below the primary combustion chamber and there is a means for introducing secondary air to the combustor to cause burning in the secondary combustion chamber after primary burning in the primary combustion chamber. The secondary combustion chamber has an ash removal port and screen means to screen ash from flow of gaseous combustion products. Preferably the screen means is in the form of a refractory brick wall having a plurality of exit slots so that gas passes out of the chamber in one direction and ash drops through the chamber in a downward direction. Tertiary air or exhaust diluent gas can be introduced into a manifold area to polish the combustion process from the secondary chamber and/or modify its temperature to a low enough temperature to avoid damage to equipment further on in the gas path.

A manifold is positioned to receive gas flowing from the secondary combustion chamber and preferably surrounds the combustion chamber. A heat exchanger is coupled to the manifold for extracting heat from the gaseous output of the manifold which heat is used to heat primary and secondary air.

In the preferred embodiment, a grate has a series of parallel tubes for supporting solid particulate fuel and is mounted to allow oscillation. The oscillation can be used in mixing the gases from the primary chamber with secondary air. The oscillation is primarily used to dislodge ash and unburned solid fuel which might otherwise clog spaces between the grate tubes and thus increase the pressure drop of gases flowing through the tubes, to an undesirable level. The preferred grate is formed of parallel generally cylindrical ceramic elements having secondary gas flow passages formed by tubes or pipes therein for passing secondary air to a combustion gas flow passing through slots between the cylindrical elements. The secondary gas flow can also act to cool the grate and thus prevent heat damage to it.

According to the method of this invention solid particulate fuel such as waste fuel is burned efficiently by introducing the fuel in particulate form into a primary combustion chamber with the fuel supported by a grate under which is a secondary combustion chamber. Drying and pyrolysis takes place in the primary combustion chamber. Primary combustion air is passed into the primary chamber to create a gaseous combustion product flow through the grate to an underlying secondary combustion chamber area. Secondary air is added to the combustion product flow to cause secondary combustion in the secondary combustion chamber whereupon the gaseous flow is impinged against an insulating screen so that ash is removed from the flow with the gaseous flow passing to a manifold area and thence to a heat exchanger. At least some of the primary combustion air is heated in the heat exchanger utilizing the heat derived from the gaseous exhaust flow.

It is an important feature of this invention that the combustor is so efficient over a large turndown rate that it provides for sufficiently complete combustion to facilitate satisfaction of Environmental Protection Agency standards for air pollution and is also efficient from a thermo-dynamic standpoint when used not only for waste fuel destruction but also to extract energy for useful purposes such as running of a boiler, turbine or the like. It is another feature of this invention that wet fuels can be efficiently burned.

The use of a multi-stage burning process enables one to keep the temperature high enough to complete combustion but low enough to minimize NOX formation. In effect, the fuel is burned to CO and partially burned pyrolysis products above the grate and to $CO_2$ and water vapor under the grate. In some cases the tertiary air added finishes combustion if not previously finished during the secondary combustion stage.

Still another feature of the invention relates to the use of a ceramic heat exchanger as a recuperator to enable efficient recuperation of heat for use in the primary or secondary combustion air flow to obtain temperatures of 1000° F. and sometimes higher. This helps to enable burning of wet fuel substantially as completely as any other fuel.

DESCRIPTION OF THE DRAWINGS

The above and other objects, advantages and features of the present invention will be better understood from a reading of the following specification in conjunction with the attached drawings in which.

DESCRIPTION OF PREFERRED EMBODIMENTS

Figure 1:
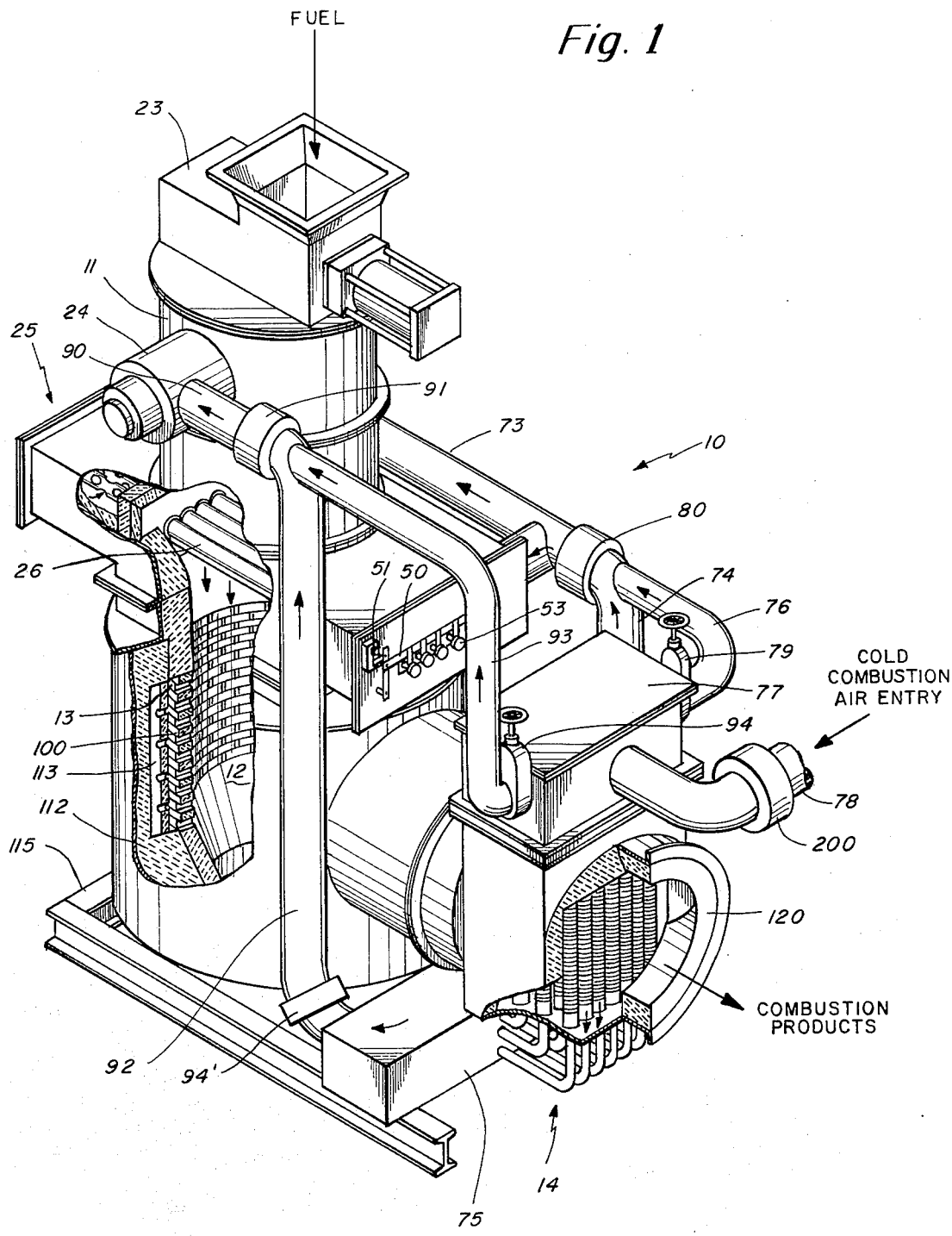
FIG. 1 is a perspective view of a solid fuel combustor in accordance with the preferred embodiment of this invention.

With reference now to the drawings, a solid fuel combustor in accordance with a preferred embodiment of this invention is illustrated generally at 10 and has a primary combustion chamber 11, a secondary combustion chamber 12 and a cylindrical manifold 13 surrounding said secondary combustion chamber to receive heated gases therefrom. A recuperator 14 recoups heat from the gases passing from the manifold 13 and a conduiting system directs heated primary and secondary air to the combustor.

The primary combustion chamber is defined by a generally cylindrical insulating wall means which may comprise cylindrical fire brick layers 20 and 21 above which is mounted a fuel feeder 23 which can be of any conventional construction. Preferably an automatic stoker-type feeder is used which enables entrance of fuel to the primary combustion area as desired while the primary combustion area remains substantially sealed from the atmosphere at all times even when fuel is added to the primary combustion chamber. An oil or gas burner is preferably contained within a housing 24 to initiate burning of fuel placed within the primary combustion chamber. Other fire initiating means can be used in place of the oil burner.

Figure 2:
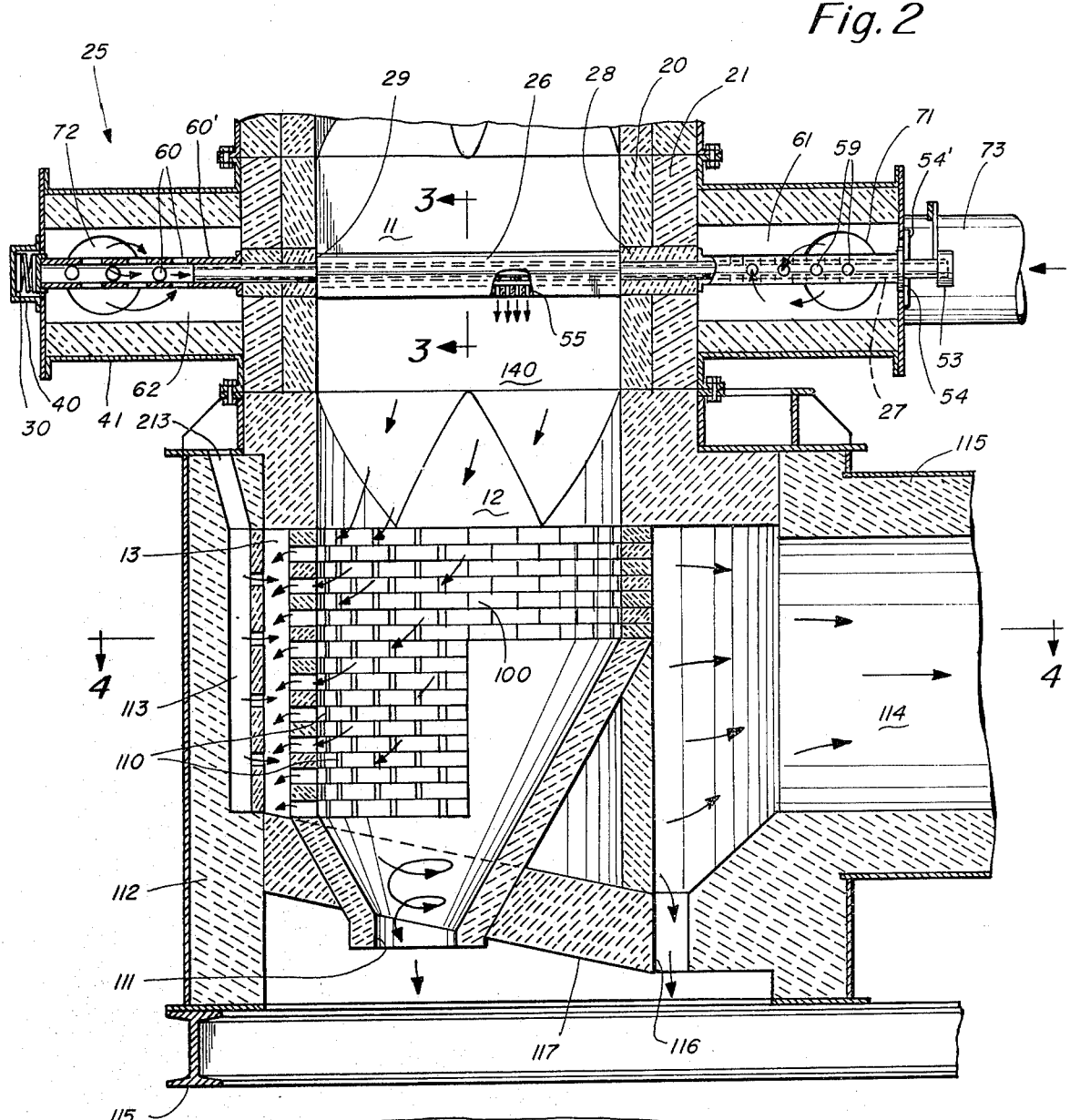
FIG. 2 is a cross sectional view thereof taken on a vertical plane through the combustion chambers.

The chamber 11 has a bottom formed by a plurality of grate means in a grate section 25 best seen in FIG. 2. The grate section preferably comprises seven elongated grate tubes or pipes 27 mounted for oscillation around their long axis. The tubes each have a central portion 26 of ceramic material such as silicon carbide or insulating ceramic with an inner liner of high temperature resistant steel pipe 27. Each pipe 27 is mounted in insulating preferably ceramic bushings 28, 29 through side walls of the combustion chamber and is spring loaded by a spring 30 capped by an outer cap member 40 attached to an overall outer steel casing 41. Each steel pipe 27 is mounted for rotation with bearings 28, 29 and attached to a conventional pivot linkage such as pivot bar 50 run by a motor 51 to pivot the pipes 27 through means of an outstanding capped end 53. A suitable high temperature resistant perforated bearing sleeve 54 permits pivoting of the pipe at a portion of the outer metallic lining 41 through which the pipe passes. A perforated high temperature resistant metal sleeve 60 is joined to each pipe 27. The entire pipe assembly and bearings are spring biased in position against a stop sealing plate 54'.

The grate tubes 27 each have downwardly depending gas passageways 55, 56 in the ceramic portion which communicate with an elongated slot 57 which slot opens to the central bore of the tube. The central bore is in turn connected to openings 59 at one end of the tube and 60 at another end. In the preferred embodiment, seven tubes as shown at 27 are used each of which is identical and thus only one is fully described. Tube 27 has an inside diameter of 2½ inches with a ceramic high temperature resistant, D-shaped covering 26 along four feet of the tube exposed in the combustion chamber 12. Preferably foil insulation (not shown) is positioned between the tube liner and the ceramic coating to further protect the metal from high temperature. The ceramic coating is preferably D-shaped in cross section so as to promote some turbulent flow at the underside of the grate to enhance mixing of secondary air from holes 55 and 56 with the gas flow passing between the tubes. The tubes in the preferred embodiment are placed about ¾ inch apart. The pressure drop across holes 55 and 56 is such as to give a jet flow while the pressure drop between the tubes and the D shape gives eddy current flow which aids in mixing. The secondary air is preferably added in an amount necessary to give a stoichiometric mixture for burning the gases from the primary combustion chamber.

The openings 59 and 60 extend into manifold areas 61 and 62 respectively which communicate with the conduiting system of the invention at 71 and 72. Ports 71 and 72 are interconnected with conduit 73 which has a first portion 74 receiving hot air from a hot manifold 75 of the recuperator 14. Cold air is passed to conduit 73 through conduit 76 which communicates with a cold air manifold 77 of the recuperator which in turn receives cold air from a cold combustion air entry port 78. A valve 79 enables cutoff or metering adjustment of the cold air flow to conduit 73 and preferably a mixer of any conventional type is located at 80 to allow adjustment of cold and hot air to achieve a desired temperature in conduit 73 and in the secondary combustion air which then passes to the tubes of the grate.

Primary combustion air for the primary combustion chamber is obtained through conduiting 90 having a conventional mixer 91 similar to the mixer 80 as known in the art. The conduiting 90 receives hot combustion gas from conduiting 92 which is in turn connected to the hot manifold 75 of the recuperator 14 and cold or ambient air from conduiting 93 which is connected to the cold air manifold 77 through a metering valve 94. Metering valve 94' and a similar valve (not shown) in conduit 74 permit adjustment of flow in conduits 92 and 74, respectively.

Figure 4:
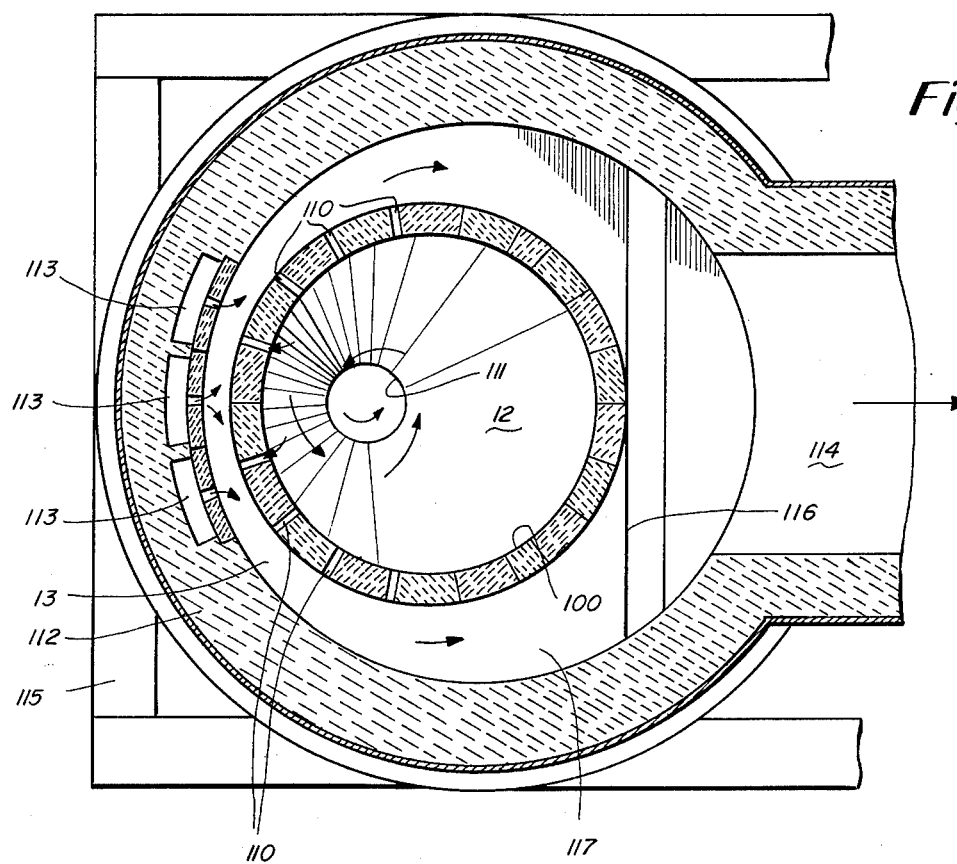
FIG. 4 is a top cross sectional view taken through line 4—4 of FIG. 2.

Underlying the grate means which supports the biomass to be burned in the combustor of this invention, is a secondary chamber 12 formed of a fire brick wall 100 which is preferably cylindrical in design. The secondary chamber need not be cylindrical but can be rectangular, square or of other suitable shapes. The fire bricks have a plurality of slits each formed between each brick as best shown in FIG. 2 at 110. The slits are located at the rear half of the circumference of the burner so that flow from the chamber is directed to the left-hand end of the manifold 13 as seen in FIG. 4. A surrounding casing 112 of high temperature resistant material has channels 113 therein which open into tertiary chamber or manifold 13 which surrounds the secondary combustion chamber.

Vertically extending passageways 113 permit entrance of tertiary air to polish combustion of the gases received from the secondary chamber and in some cases lower their temperature so that the gases can be used in downstream equipment without being too hot to damage such equipment. Alternately, the passageways 113 can be used for entrance of a diluent inert gas where no further combustion reaction is necessary or desired in any particular case. In the preferred embodiment, atmospheric air is blown into the passageways 113 at room temperature to pass to manifold 13 as shown by the arrows of FIGS. 2 and 4.

The manifold 13 extends to a hot gas passageway 114 lined with fire brick or other ceramic insulating material 115 as known in the art. The entire combustor has a metal casing 41 as shown in the drawings and preferably rests on railings 115. This permits ease of removal of the ash which drops through the port 111 and a second port 116. The manifold 13 is defined in part by a slanted bottom wall 117 which leads to the slot 116 used for clean-out of any ash that does get into the manifold and is not dropped through the port 111.

Gases pass through the channel 114 to the final component of the combustor system which is a recuperator. The recuperator 14 removes heat from the gases and uses that heat to heat primary and secondary combustion air as will be described. This is important to enable burning of wet fuel economically and with minimized production of unwanted by-products. The heat acts to dry the fuel which may contain from 10 to 70% moisture in the case of wood products. Where fuel drying is not a requirement of the system, no recuperator or heat exchanger 14 need be used in the system. Preferably the recuperator is a ceramic recuperator which enables one to obtain heated air in the manifold at a temperature of up to 1000° F. Ceramic recuperators formed from ceramic tubes of the type described in U.S. Pat. No. 4,029,465 are preferred for use although in some cases other recuperators can be used. The product gas which passes through the recuperator and out of flange 120 is the combustion product gas which can then be used to energize boilers, air heaters and the like as may be desired. Flow is established through the combustor by either a forced draft fan blowing in through pipe 78 or an induced draft fan on the exhaust of equipment such as a boiler attached to flange 120. A forced draft fan is diagrammatically illustrated at 200 in FIG. 1.

Having now described the principal structure involved, the actual combustion process is further described as taking place in three principal areas. The primary combustion chamber acts as a pyrolysis chamber where the moist or other biomass products of coal, wood, bark, refuse, lignite or the like is pyrolyzed. The secondary combustion chamber or combustion liner preferably underlies the primary combustion chamber and permits further combustion with passage of the combustion product gases to a tertiary zone which acts for combustion polishing and in some cases tempering the temperature of the combustion gases.

The grate means separates the primary combustion chamber from the underlying secondary combustion chamber and has an important function in the downdraft combustor of the present invention.

The grate supports the solid fuel until it is converted by pyrolysis to a gaseous or liquid form thus preventing it from passing to the secondary chamber while permitting the gaseous by-product to pass with the minimum pressure drop to the secondary chamber along with an unwanted but necessarily produced small ash content. The grate means also acts as a means to introduce secondary combustion air into the secondary chamber to burn the products of the pyrolysis process to carbon dioxide and water vapor and substantially complete the burning process. The grate further permits ash and other inert materials to pass through into the secondary chamber in a limited amount.

The primary air introduced into the primary combustion chamber is heated prior to entering the chamber to a temperature sufficiently elevated to assure rapid and complete pyrolysis of the fuel. The primary air is preferably passed substantially over the top of the fuel to dry the fuel as burning occurs substantially at the bottom of the pile of fuel. The fuel charge is itself burned in some cases by the use of an oil burner to start the burning process although further use of the oil burner is unnecessary. In general, from 40 to 70% of the stoichiometric air needed for complete burning, is introduced into the primary chamber to complete pyrolysis of the wood residue. Preferably this air is introduced at a temperature of 1000° F. or below accomplished by mixing in the conduit passageways as previously described. The primary combustion air is preferably introduced at from ambient to 1000° F. depending on the moisture content of the solid fuel. When a dry fuel is burned in the combustor the primary air can be unheated. In fact in some cases, the recuperator can be eliminated if the fuel will always have a moisture content of less than 15% by weight.

The primary chamber need not be cylindrical but can be rectangular or of other cross sectional shapes.

The secondary combustion chamber best shown in FIGS. 1 and 2 with its insulated fire brick wall acts as a screen means or combustion liner. Although a cylindrical chamber is shown, other shapes can be used. The chamber starts substantially at the grate area and extends downwardly through fire brick lined upper area 140 to the cylindrical area and then conical lower area. The ash exit port 111 acts to allow removal of ash to a hopper area or directly to ash removal equipment which may be situated in a container (not shown) below the combustor. The combustion of the products of pyrolysis from the primary chamber occurs in the secondary chamber and the combustion process is taken essentially to completion therein. The combustion products in gaseous form flow from the secondary chamber through the slits 110 to the manifold area 13. These slits are provided to form a screen-like means only on the side of the wall closest to the outer retaining wall 112. The hot gases then pass in a swirling action to passageway 114 supplemented by tertiary air from passageway 113 or diluent gases which act to modify the temperature as desired. For example the temperature in the primary combustion area can be in the range of from 1800° F. to 2400° F. but preferably below 2000° F. while the temperature in the secondary combustion area can reach levels as high as 2600° F. which could damage equipment located downstream thereof. Preferably air passing to passageway 114 or out of the flange 120 is reduced to a temperature of from 2000° F. to 2500° F. and can be reduced to 1200° F. or lower if desired.

Since there is a downdraft in the burning zones, when the combustion gases pass through the screen means to the manifold 13, some of the gases will impinge on the side bricks of the screen which acts to separate the particulate ash or other solid by-products from the gas stream. The higher relative inertia of the particles in the gas stream cause them to collect on the wall, agglomerate and slide down in a liquid or particle stream which then passes through the ash port 111.

The entire system operates at higher than atmospheric pressure when a forced draft is used and lower than atmospheric pressure if an induced draft is used.

All the surfaces of the combustion chambers, the grate and other surfaces exposed to high temperature gas such as the conduit 114 are composed of ceramic materials suitable for the purpose and resistant to the products of combustion. Such high temperature material can be low density high purity alumina. Other ceramic materials which are not necessarily insulators but resist heat deterioration such as high alumina chrome brick resistant to combustion products such as oxides of alkali metals can also be used to line areas of the combustion zones.

In some cases, water cooled metal elements as known for use in steam generators can be used to line the combustion chamber.

Figure 3:
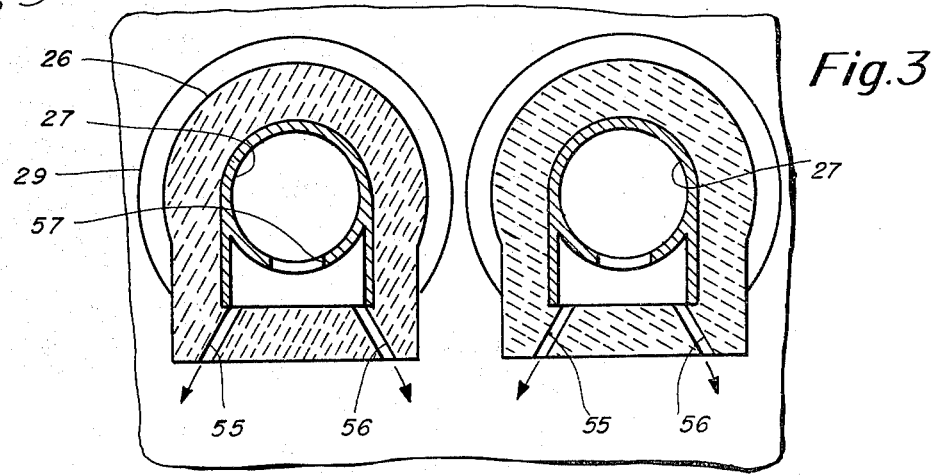
FIG. 3 is a cross sectional view taken through line 3—3 of FIG. 2.

It is preferred that the grate used to support the fuel have mechanical mounting such as to permit oscillation of the elements. This oscillation as previously described dislodges ash and unburned solid fuels which tend to clog spaces between the grate tubes and as a consequence increase the pressure drop of gas flowing through the grate to an intolerable level. When a series of parallel tubes constructed of ceramic material having sufficient strength to support the fuel in the primary chamber is used, each tube can be internally cooled by the secondary air flow itself while the secondary air flow acts as a combustion air flow when passed under the tubes. The tubes are preferably shaped as shown in FIG. 3 with a cylindrical top portion in cross section and square lower portion which act to have the combustion gas form an eddy on the secondary chamber side of the tubes. A series of inlet air ports in the grate tube inject secodary air into the vortex thereby obtaining thorough mixing of combustibles below the grate. Generally about 40 to 60% of the air necessary to complete combustion as required for stoichiometric conditions is passed through the grate while from 60 to 40% of combustion air is introduced as primary air.

The control of energy released by the combustor is determined by the quantity of air flowing to the primary combustion zone. By reducing the flow of primary air, the pyrolysis process is dampened and may be completely stopped. Thus the energy released by the combustor is determined by the quantity of air introduced into the primary zone. The air to the seondary zone is regulated to maintain a maximum temperature of 2600° F. which is sufficient to completely dispose of the products of pyrolysis and to melt the inert material into a molten slag which can easily be removed by the ash port at the bottom of the chamber. The air introduced by the tertiary ports located in the manifold wall is determined by the temperature at the exit of the combustor. By regulating the tertiary air essentially a constant temperature to the heat exchanger may be maintained or varied as desired through a wide range of turndown. The pressure in the combustor can vary with secondary combustion air being at for example 15.9 psi, primary combustion air at 15.6 psi and the combustion product exiting through tube 114 at 15.1 psi and a temperature of 2500° F. which can be designed to result in a combustion product gas temperature leaving the flange 120 at for example 2200° F. and 15 psi.

In a specific example of this invention 15,000,000 BTU/hr heating value can be obtained from the heated product gas at flange 120 when the primary chamber has a diameter of 3½ feet and a volume of 40 cubic feet, filled with wood bark particles with 50% moisture from a typical sawmill waste pile. The secondary chamber has a volume of 40 cubic feet. Sixty percent of combustion air is introduced at 1000° F. through line 90 and 40% of combustion air needed for stoichiometric burning is introduced at 77° F. in the grate means. The pressure drop across the jets 55, 56 is from 0.5 to 20 and from 0.2 to 10 inches of water between the top of the fuel pile and the bottom of the grate tubes. Tertiary air is added at ambient temperature in an amount of 0.1 cubic feet to each cubic foot of product gas passing to manifold 13.

The control system for the combustor is as stated above directed by controlling the air flow through the system. Temperature can be monitored in the primary combustion zone and held in the range of 1800° F. to 2400° F. by changing the proportion of preheated to cold primary combustion air. When secondary air is introduced, all pyrolysis products undergo substantially complete combustion if mixing is adequate which depends on the dimensions of the tubes and sizing of spaces between the tubes of the grate. Secondary air flow is controlled in parallel with primary air to provide sufficient oxygen to completely burn out the pyrolyzed gas products from the fuel bed. The ratio of primary to secondary air and the temperature of the primary and secondary air is chosen to minimize emissions, prevent slagging in the primary zone and to keep secondary temperatures high enough to melt the ash into a slag which can be easily removed through the ash port at the bottom of the chamber yet below a temperature at which the refractory material of the secondary chamber is attacked by the ash.

The wetter the fuel the more primary air needed to get the bed of fuel hot enough to insure complete combustion in the secondary zone. Excess secondary combustion air over the amount required to complete combustion can be used to limit the temperature in the secondary combustion chamber and the temperature of the entering secondary air can also be varied as required.

Cold tertiary air or recirculated combustion gases added through the tertiary portion as through inlet 213 is regulated by a temperature monitor so as to keep the temperature of the gases in tube 114 at an optimum value over a wide turndown range. Under certain transient operating conditions where there is not sufficient secondary air, and oxygen is available in the tertiary zone, some of the combustion can take place in the tertiary zone.

Preferably the combustor of this invention is operated with controls of a standard type which can measure the pressure drop from under the grate means to the top of the fuel pile just above the highest level of fuel in the primary combustion chamber. The results of that measurement are used to detect the amount of fuel in the chamber and cause automatic operation of an automatic stoker such as a star feeder to constantly maintain a sufficient height in the fuel pile to prevent chaneling of the fuel. The pressure drop from above the fuel to below the grate is preferably maintained at a value of from 0.2 to 10 inches of water.

The combustor of this invention differs from most burners in that the amount of fuel has little to do with the burning rate or the temperature produced in the combustor. The burning rate is varied by the amount of primary air and its temperature when admitted to the primary combustion chamber. The rate of primary air flow and temperature can be adjusted by manual operation of the mixing valves or automatic operation of the mixing valves in response to the temperature of the bed of fuel just above the grate means and the demand for energy using the system. For example, if pressure in a boiler hooked to the flange 120 is to be the determining feature, a rise in that pressure can automatically by conventional controls be used to cause a lowering of primary air flow. A temperature sensor in the bed is then used to control the mixing of hot and cold gases in the primary air stream so as to maintain the temperature in the primary combustion chamber between the desired value of for example 1800° to 2400° F. Similar controls can be used to monitor the temperature at various portions of the system and to vary the temperature of secondary air and its volume as well as the temperature and volume of tertiary air or a diluent gas added through ports 113. For example the diluent gas can be gas flow from flange 120 returned through the port 213 which merely adjusts temperature of the product gas passing to passageway 114. A conventional pressure drop sensing transducer such as a quartz fiber manometer can be used to measure pressure drops in the combustor.

While a specific embodiment of the invention has been shown and described, many variations are possible. For example, while the grate means of the present invention is preferred, a non-movable grate can be used. The grate can be water cooled in some cases. That is, the function of cooling the grate need not be combined with the introduction of secondary air. The materials of the chambers can vary. The insulating linings can be conventional high temperature resistant ceramics such as refractory materials, alumina, fire brick, MIN-K or other suitable materials. The secondary combustion chamber wall and ceramic about the tubes 27 need not be an insulating material but could be silicon carbide or special refractories resistant to deterioration by the products of combustion. In some cases, a double wall is used to provide deterioration resistance in a first liner and heat insulation in a surrounding layer.

The removal of ash in the combustor is important to prevent contamination of downstream components. The use of the recuperator to heat the combustion air for primary or secondary use is further important to maximize efficiency of the system when wet fuel is burned.

What is claimed is:

1. A solid fuel combustor for efficient burning of fuel, comprising, a primary combustion chamber having means for introduction therein of primary air and a fuel entrance port for filling said chamber with solid particulate fuel, a support grate underlying said primary combustion chamber for carrying said fuel thereon, a secondary combustion chamber below said primary combustion chamber, means for introducing secondary air to said combustor to cause burning in said secondary combustion chamber, said secondary combustion chamber defining ash removal ports and screen means to screen ash from flow of gaseous combustion products, said screen means defining plural gas passageways from said secondary combustion chamber to a manifold area to permit gas flow in directions opposed to a direction of travel of ash removed from said gas flow, a heat exchanger coupled to said manifold for extracting heat from gaseous output of said manifold which is used to heat air for use in said combustor and means for introducing a gas to said manifold area for maintaining said combustor at a safe outer temperature of operation.

2. A solid fuel combustor for efficient burning of fuel, comprising, a primary combustion chamber having means for introduction therein of primary air and a fuel entrance port for filling said chamber with solid particulate fuel, a support grate underlying said primary combustion chamber for carrying said fuel thereon, a secondary combustion chamber below said primary combustion chamber, means for introducing secondary air to said combustor to cause burning in said secondary combustion chamber, said secondary combustion chamber defining ash removal ports and screen means to screen ash from flow of gaseous combustion products, said screen means defining plural gas passageways from said secondary combustion chamber to a manifold area to permit gas flow in directions opposed to a direction of travel of ash removed from said gas flow, a heat exchanger coupled to said manifold for extracting heat from gaseous output of said manifold which is used to heat air for use in said combustor, said manifold area being defined by a wall surrounding said secondary combustion chamber, said secondary combustion chamber being substantially cylindrical and formed of a high heat deterioration resistant side wall, said side wall defining a plurality of slots acting as screening slots for residue products of combustion while allowing flow of gaseous products of combustion, conduiting means for introducing primary air to said primary combustion chamber and secondary air to said secondary combustion chamber, said primary air conduiting means comprises a first pipe for receiving hot air from said heat exchanger and a second pipe for receiving cold untreated air, and mixer means for mixing said hot and cold air and metering means for metering the proportion of hot and cold air to be mixed.

3. A solid fuel combustor for efficient burning of fuel, comprising, a primary combustion chamber having means for introduction therein of primary air and a fuel entrance port for filling said chamber with solid particulate fuel, a support grate underlying said primary combustion chamber for carrying said fuel thereon, a secondary combustion chamber below said primary combustion chamber, means for introducing secondary air to said combustor to cause burning in said secondary combustion chamber, said secondary combustion chamber defining ash removal ports and screen means to screen ash from flow of gaseous combustion products, said screen means defining plural gas passageways from said secondary combustion chamber to a manifold area to permit gas flow in directions opposed to a direction of travel of ash removed from said gas flow, a heat exchanger coupled to said manifold for extracting heat from gaseous output of said manifold which is used to heat air for use in said combustor, said manifold area being defined by a wall surrounding said secondary combustion chamber, said secondary combustion chamber being substantially cylindrical and formed of a high heat deterioration resistant side wall, said side wall defining a plurality of slots acting as screening slots for residue products of combustion while allowing flow of gaseous products of combustion, conduiting means for introducing primary air to said primary combustion chamber and secondary air to said secondary combustion chamber, and said secondary air conduiting means comprises a first pipe for receiving hot air from said heat exchanger and a second pipe for receiving cold untreated air, and mixing means for mixing said hot and cold air and metering means for metering the proportion of hot and cold air to be mixed.

4. A solid fuel combustor for efficient burning of fuel, comprising, a primary combustion chamber having means for introduction therein of primary air and a fuel entrance port for filling said chamber with solid particulate fuel, a support grate underlying said primary combustion chamber for carrying said fuel thereon, a secondary combustion chamber below said primary combustion chamber, means for introducing secondary air to said combustor to cause burning in said secondary combustion chamber, said secondary combustion chamber defining ash removal ports and screen means to screen ash from flow of gaseous combustion products, said screen means defining plural gas passageways from said secondary combustion chamber to a manifold area to permit gas flow in directions opposed to a direction of travel of ash removed from said gas flow, said grate comprises a plurality of elongated parallel tubes, said tubes each having a high temperature resistant ceramic casing so as to cause turbulence in gas flow through said grate, and secondary air passageways in said grate tubes for jetting secondary air into said gas flow through said grate means.

5. In a method of burning solid fuel efficiently where fuel is burned in a first chamber and the combustion products drawn downwardly through a grate, the improvement comprising, drawing said combustion products into a secondary combustion chamber, said chamber walls being formed of a high temperature resistant refractory material having gas passage slots therethrough, passing substantially finished products of combustion through said slots to the outside of said chamber while removing solid products thereof by impingement on said walls and gravity drop to a removal area and adding tertiary combustion of air about the outside of said secondary combustion chamber which tertiary air further acts to cool the outside of said secondary combustion chamber.

6. In a method of burning solid fuel efficiently where fuel is burned in a first chamber and the combustion products drawn downwardly through a grate, the improvement comprising, drawing said combustion products into a secondary combustion chamber, said chamber walls being formed of refractory bricks and and said slots are formed by spaces between adjacent bricks, passing substantially finished products of combustion through said slots to the outside of said chamber while removing solid products thereof by impingement on said walls and gravity drop to a removal area and adding diluent gas about the outside of said secondary combustion chamber which diluent gas further acts to cool the outside of said secondary combustion chamber.

* * * * *